(12) United States Patent
Dugan

(10) Patent No.: US 10,740,563 B2
(45) Date of Patent: Aug. 11, 2020

(54) SYSTEM AND METHODS FOR TEXT CLASSIFICATION

(71) Applicant: Benedict R. Dugan, Seattle, WA (US)

(72) Inventor: Benedict R. Dugan, Seattle, WA (US)

( * ) Notice: Subject to any disclaimer, the term of this patent is extended or adjusted under 35 U.S.C. 154(b) by 0 days.

(21) Appl. No.: 15/889,168

(22) Filed: Feb. 5, 2018

(65) Prior Publication Data

US 2018/0225280 A1 Aug. 9, 2018

Related U.S. Application Data

(60) Provisional application No. 62/454,581, filed on Feb. 3, 2017.

(51) Int. Cl.
| | |
|---|---|
| *G06F 40/279* | (2020.01) |
| *G06F 40/30* | (2020.01) |
| *G06N 20/20* | (2019.01) |
| *G06N 20/00* | (2019.01) |
| *G06N 7/00* | (2006.01) |

(52) U.S. Cl.
CPC ........... *G06F 40/30* (2020.01); *G06N 20/00* (2019.01); *G06N 20/20* (2019.01); *G06N 7/005* (2013.01)

(58) Field of Classification Search
CPC ...... G06F 16/353; G06F 17/27; G06F 17/277; G06F 40/279; G06F 40/30; G06N 20/00; G06N 20/20; G06Q 50/184
USPC ...................... 704/1, 9; 706/12, 20; 705/310
See application file for complete search history.

(56) References Cited

U.S. PATENT DOCUMENTS

| | | | | |
|---|---|---|---|---|
| 6,684,202 | B1 * | 1/2004 | Humphrey | G06F 17/2715 706/45 |
| 6,772,149 | B1 * | 8/2004 | Morelock | G06F 16/334 |
| 7,444,589 | B2 * | 10/2008 | Zellner | G06F 16/382 715/255 |
| 7,707,129 | B2 * | 4/2010 | Zhuang | G06F 16/353 706/20 |
| 10,157,352 | B1 * | 12/2018 | Chan | G06N 20/00 |
| 2006/0080135 | A1 * | 4/2006 | Frank | G06Q 50/184 705/310 |
| 2006/0155572 | A1 * | 7/2006 | Postrel | G06Q 50/184 705/310 |
| 2007/0219988 | A1 * | 9/2007 | Mueller | G06Q 50/184 |

(Continued)

OTHER PUBLICATIONS

2019 Revised Patent Subject Matter Eligibility Guidance: Advanced Module, 201 Pages. (Year: 2019).*

(Continued)

*Primary Examiner* — Martin Lerner
(74) *Attorney, Agent, or Firm* — Benedict R. Dugan; Lowe Graham Jones PLLC

(57) ABSTRACT

Techniques for improving machine learning and text classification are described. The described techniques include improved processes for collecting training data to train a machine classifier. Some data sets are very large but contain only a small number of positive or negative training examples. The described text classification system obtains training examples by intelligently identifying documents that are likely to present or identify positive or negative training examples. The text classification system employs these techniques to train a classifier to categorize patent claims according some legal rule, such as subject-matter eligibility requirements under patent law.

19 Claims, 11 Drawing Sheets

(56) References Cited

U.S. PATENT DOCUMENTS

| | | | | |
|---|---|---|---|---|
| 2007/0220105 A1* | 9/2007 | Van Luchene | ....... | G06Q 10/087 709/217 |
| 2011/0125747 A1* | 5/2011 | Gartung | ................ | G06F 16/353 707/737 |
| 2012/0166370 A1* | 6/2012 | Hu | ....................... | G06F 16/353 706/12 |
| 2013/0198092 A1* | 8/2013 | Dugan | ................ | G06Q 50/184 705/310 |
| 2014/0067696 A1* | 3/2014 | Lee | .................... | G06O 50/184 705/310 |
| 2014/0180934 A1* | 6/2014 | Surdeanu | ............ | G06Q 50/184 705/310 |
| 2015/0032645 A1* | 1/2015 | McKeown | ............. | G06F 16/93 705/311 |
| 2016/0042292 A1* | 2/2016 | Caplan | .................. | G06N 20/00 706/12 |
| 2016/0078349 A1* | 3/2016 | Byron | ................ | G06F 16/3329 706/12 |
| 2016/0117589 A1* | 4/2016 | Scholtes | .............. | G06F 16/355 706/12 |
| 2017/0039663 A1* | 2/2017 | Gross | ................... | G06Q 50/184 |
| 2017/0046393 A1* | 2/2017 | Pedersen | .............. | G06Q 50/184 |
| 2017/0109848 A1* | 4/2017 | Bufe, III | .............. | G06Q 50/184 |
| 2017/0169358 A1* | 6/2017 | Choi | ................... | G06F 16/9535 |
| 2017/0351749 A1* | 12/2017 | Quirk | ................... | G06F 17/278 |
| 2018/0032505 A1* | 2/2018 | Hoetzer | ................ | G06F 17/277 |

OTHER PUBLICATIONS

Sahami, Mehran et al., "A Bayesian Approach to Filtering Junk E-Mail", Computer Science Department, Stanford University, Stanford, California; Microsoft Research, Redmond, Washington; AAAI Technical Report WS-98-05, AAAI (www.aaai.org), 1998, 8 pages.

* cited by examiner

Fig. 3B

3200: The process of *3100*, wherein the determining a set of documents that are each likely to identify another document that can serve as a text classification training example includes:

- 3201: downloading multiple documents
- 3202: determining one or more features that are correlated with documents that are associated with training examples
- 3203: generating a list of documents having the determined features

Fig. 3C

3300: The process of *3200*, further comprising:

- 3301: training, based on the one or more features, a second machine learning model to recognize documents that reference training examples

Fig. 3D

*3400*: The process of *3100*, wherein the determining a set of documents that are each likely to identify another document that can serve as a text classification training example includes:

*3401*: identifying patent applications that have associated office actions that include subject-matter rejections, wherein the training examples are patent claims obtained from the publications or patents issued from the patent applications

Fig. 3F

*3600*: The process of *3500*, wherein the determining a set of patent applications includes:

*3601*: downloading multiple office actions

*3602*: determining one or more features that are correlated with subject-matter rejections

*3603*: generating a list of patent applications having the determined features

Fig. 3G

*3700*: The process of *3500*, further comprising:

*3701*: receiving text of a patent claim

*3702*: determining, based on the trained machine learning model, whether or not the patent claim is patent eligible

*3703*: providing output that describes whether or not the patent claim is patent eligible

Fig. 3H

3800: The process of 3700, further comprising:

3801: training multiple machine learning models

3802: determining whether or not the patent claim is patent eligible based on results obtained from the multiple machine learning models

Fig. 3I

3900: The process of 3700, further comprising:

3901: training multiple machine learning models

3902: receiving an indication of a classifier sensitivity level

3903: selecting one of the machine learning models based on the classifier sensitivity level

3904: determining whether or not the patent claim is patent eligible based on text of the patent claim evaluated by selected machine learning model

Fig. 3J

*31000*: The process of *3700*, further comprising:

*31001*: providing output that highlights one or more terms from the patent claim to indicate a positive or negative association between each term and patent eligibility

SYSTEM AND METHODS FOR TEXT CLASSIFICATION

CROSS-REFERENCE TO RELATED APPLICATIONS

This application claims the benefit of U.S. Provisional Patent Application No. 62/454,581, entitled "System and Method for Evaluating Patent Claims for Subject Matter Rejections Under Alice v. CLS Bank," filed Feb. 3, 2017, the content of which is incorporated herein by reference in its entirety.

TECHNICAL FIELD

The present disclosure relates to methods, techniques, and systems for text classification, such as improved techniques for the collection of training data and the presentation of classification results.

BACKGROUND

Machine learning can be employed to generate a model that is capable of classifying documents. As one example, Sahami et al. describe an approach for training a Bayesian model to classify email messages as junk (spam) or not junk. M. Sahami et al. "A Bayesian approach to filtering junk e-mail," AAAI'98 Workshop on Learning for Text Categorization.

Within the technical art of machine classification, obtaining a useful set of training examples presents a challenge. It is important to expose the classifier to a wide variety of training examples, so that the classifier can properly generalize its classification function. In the some contexts, it can be difficult to efficiently obtain a training set. For example, many datasets are not stored in a format that is readily accessible, in contrast to emails, which are largely text-based. Furthermore, some datasets are vast but only include a small number of positive or negative examples, making the task of finding suitable training examples one of finding a needle in a haystack.

BRIEF DESCRIPTION OF THE DRAWINGS

FIGS. 3A-3J are flow diagrams of processes performed by example embodiments.

DETAILED DESCRIPTION

Embodiments described herein provide enhanced computer- and network-based methods, devices, and systems for text classification. The described techniques address shortcomings and challenges with existing technologies, especially as they are applied within the context of using machine classification to classify documents according to legal rules.

The described techniques were invented in the context of using machine learning to classify patent claims according to legal rules. The initial challenge was to determine whether a patent claim (a text sentence) complied with subject-matter eligibility rules under 35 U.S.C. 101 and corresponding caselaw. In building a computing system to address this challenge, the inventor solved a number of technical problems with standard machine learning approaches. Just because the original motivation was to build a machine to perform functions previously performed only by humans does not detract from the technical nature of the described invention. The following description and claims address specific solutions for solving technical problems, and not just solutions in the abstract.

1. Overview

Figure 1A:
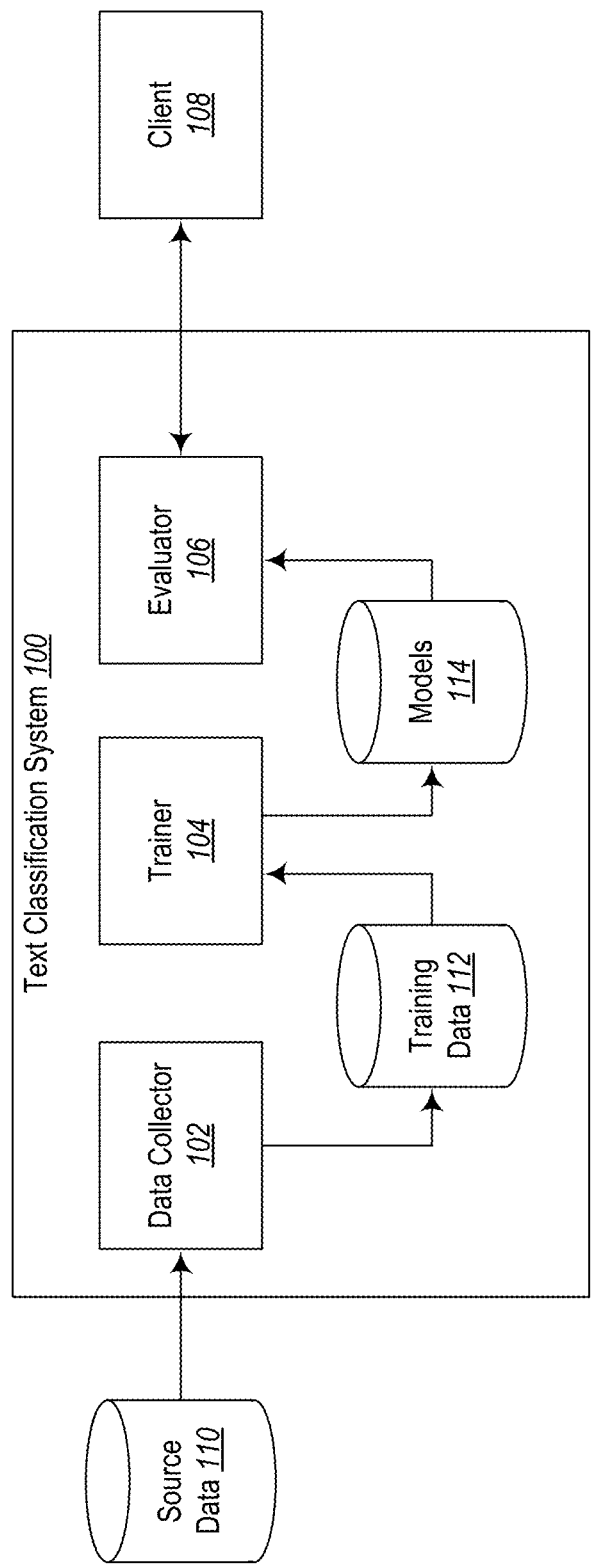
FIG. 1A is a block diagram of an example text classification system.

FIG. 1A is a block diagram of an example text classification system 100 ("TCS"). The TCS 100 functions to learn one or more classification functions and evaluate text in light of those functions. In the described embodiment, the TCS 100 focuses on learning legal rules based on the application of those rules to patent claims. The TCS 100 includes a data collector 102, a trainer 104, an evaluator 106, training data 112, and models 114. The TCS 100 obtains data from a patent source data 110. The TCS 100 also interacts with a client 108 to evaluate patent claims.

The data collector 102 is responsible for obtaining training examples from the source data 110. In one embodiment, the source data 110 includes patent data, which includes published applications, issued patents, and prosecution history data for those applications/patents. In other embodiments, the source data 110 could also or instead include trial or appeal court decisions, aggregate statistical information about the patent corpus, etc.

The data collector 102 processes prosecution history data from the source data 110 to identify claims that have been analyzed (by an examiner) under a legal rule. In those cases where a claim has been analyzed by the examiner, the claim is stored in the training data 112, along with an indication of the examiner's disposition (e.g., accepted or rejected).

The trainer 104 learns to classify text based on the training data 112. In this embodiment, the trainer 104 learns to classify patent claims according to a particular legal rule. The trainer 104 obtains a training set of claims from the training data 112, where each claim is labeled or categorized according to its associated disposition. The trainer 104 then employs machine learning techniques to train one or more models to classify claims according to the legal rule. The models are stored as models 114.

The evaluator 106 interacts with clients to analyze given text blocks or documents. In this embodiment, the evaluator 106 is configured to evaluate patent claims. For example, a user operating client 108 may transmit an example patent claim to the evaluator 106. The evaluator 106 processes the claim according to a trained model stored in models 114. The classification result provided by the model is then transmitted back to the client 108 for display.

Figure 1B:
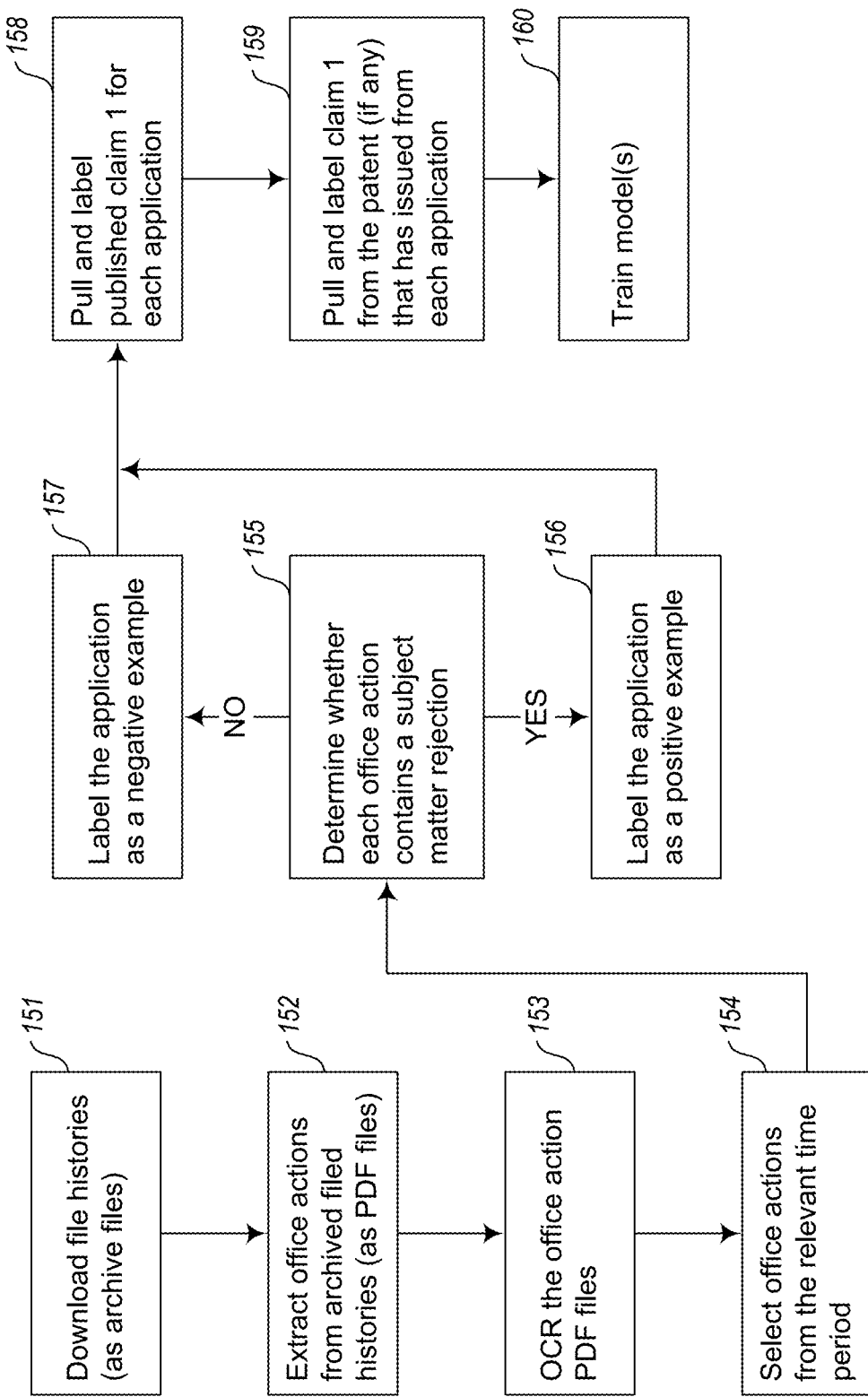
FIG. 1B is a flow diagram of a data collection process according to one embodiment.

FIG. 1B is a flow diagram of a data collection process according to one embodiment. This embodiment is tailored specifically to learn whether a particular claim is patent eligible under 35 U.S.C. 101 as interpreted by the courts in relevant caselaw, such as Alice v. CLS Bank. Other embodiments may be configured to learn other legal rules or classification functions.

The described techniques rely on as raw material those patent applications that have been evaluated by the Patent Office for subject-matter eligibility under relevant caselaw (e.g., Alice v. CLS Bank). In the Patent Office, each patent application is evaluated by a patent examiner, who determines whether or not to allow the application. Under principles of "compact prosecution," the examiner is expected to analyze the claims for compliance with every statutory requirement for patentability. The core statutory requirements include those of patent-eligible subject matter, novelty, and non-obviousness. If the examiner determines not to allow an application, the examiner communicates the rejection to an applicant by way of an "office action." An office action is a writing that describes the legal bases and corresponding factual findings supporting the rejection of one or more claims.

The described approach inspects office actions issued during a particular time period (e.g., after the Alice decision) in order to find examples of patent eligible and ineligible claims. If the office action contains a subject-matter rejection, then the rejected claim is clearly an example of a patent-ineligible claim. On the other hand, if the office action does not contain a subject-matter rejection, then the claims of the application provide examples of patent-eligible claims, because we assume that the examiner has evaluated the claims with respect to all of the requirements of patentability, including a subject-matter compliance. If no subject-matter rejection is present in an office action, then the examiner must have determined that the claims were directed to eligible subject matter.

The goal, therefore, is to find office actions issued after the time at which the Patent Office at large began examining cases for compliance with a particular subject-matter rule. With respect to Alice v. CLS Bank, the case was decided on Jun. 19, 2014. The Patent Office issued preliminary instructions for subject-matter eligibility examination on Jun. 25, 2014. In view of this regulatory history of the Patent Office the described embodiment uses Jul. 1, 2014, as the relevant cutoff date. Any office action issued on or after the cutoff date therefore represents an evaluation of a patent application under prevailing subject-matter eligibility requirements. Different cutoff dates would be used for other decisions that change the law.

FIG. 1B is a generalized flow diagram that illustrates data collection operations performed to obtain office actions for analysis. Initially, in step 151, the process collects the file histories ("file wrappers") for a selected set of application numbers. Each file history is a ZIP archive file that includes multiple documents, including the patent application as filed, office actions, notices, information disclosure statements, applicant responses, claim amendments, and the like. In typical embodiments, the application numbers are selected based on a feedback mechanism. When office actions with subject-matter rejections are found (as discussed below), the process automatically looks for other applications having "nearby" application numbers.

In step 152, the process extracts office actions from file history ZIP archives. As discussed above, the process is interested in finding office actions issued by the Patent Office on or after a particular cutoff date. The Patent Office uses a naming convention to identify the files within a file history. For example, the file 12972753-2013-04-01-00005-CT-FR.pdf is a Final Rejection (as indicated by the document code CTFR) dated Apr. 1, 2013, for application Ser. No. 12/972,753. When a file history ZIP file is unpacked, the document code can be used to identify relevant documents, which in this case are Non-Final and Final Rejections.

Each office action in the file history is a PDF document that includes images of the pages of the document produced by the examiner. The PDF file does not include native text. Therefore, in step 153, each of the office actions must be run through an optical character recognition (OCR) module to convert the PDF document to a text file.

Once an office action is converted to text, it can be searched (e.g., in step 155) for strings that are associated with subject-matter rejections. Patent examiners tend to rely on form paragraphs provided by the Patent Office when making or introducing a rejection, so there is fortunately a high level of consistency across office actions. Text strings such as the following can be used to identify actions that contained a subject-matter rejection: "35 USC 101," "abstract idea," "natural phenomenon," and the like.

Note that other implementations may use other approaches to identifying office actions that contain subject-matter rejections. For example, some embodiments may train a classifier to identify office actions that include subject-matter rejections. This training may be accomplished by applying machine learning to generate a model based on positive and negative examples identified manually or using automated techniques such as those described above.

In step 154, from the full set of obtained office actions, the process selects those issued on or after the cutoff date. In some embodiments, this selection process occurs prior to step 153, so that office actions outside of the relevant time period need not be put through the OCR module.

In step 155, the process then analyzes each office action in this subset to determine whether it contained a subject-matter rejection. If an office action does contain a subject-matter rejection, then the corresponding application is tagged (in step 156) as including a patent-ineligible claim (sometimes also termed REJECT); conversely, if an office action does not contain a subject-matter rejection, then the corresponding application is tagged (in step 157) as including eligible claims (or ACCEPT).

In step 158, the process identifies the claim that is subject to the subject-matter rejection. Typically, the examiner will identify the claims rejected under a particular statutory provision. For example, the examiner may write "Claims 1, 3-5, and 17-20 are rejected under 35 USC 101 . . . " Some embodiments parse this sentence to identify the exact claims rejected for lack of patentable subject matter. Other embodiments make the simplifying assumption that, at a minimum, the first independent claim (typically claim 1) was being rejected for lack of patentable subject matter.

Some embodiments make another simplifying assumption to find the actual claim text rejected by the examiner. In particular, the process pulls the text of the first independent claim ("claim 1") of the published patent application. Note that this claim is typically the claim that is filed with the original patent application, although it is not necessarily the claim that is being examined when the examiner makes the subject-matter rejection. For example, the applicant may have amended claim 1 at some time after filing and prior to the particular office action that includes the subject-matter rejection. However, it is unlikely that the claim 1 pending at the time of the subject-matter rejection is markedly different from the originally filed claim 1. If anything, the rejected claim is likely to be more concrete and less abstract due to further amendments that have been made during examination.

Using claim 1 from the published application is also advantageous because it can be efficiently and accurately obtained from various sources, such as the Patent Office. Each patent file history contains documents that reflect the amendments made to the claims by the applicant. It is therefore technically possible to OCR those documents to determine the text of the claims pending at the time of a subject-matter rejection. However, because applicants reflect amendments to the claims by using strikethrough and underlining, these text features greatly reduce the accuracy of some OCR systems. Some embodiments therefore trade off efficiency (and accuracy of claim text) for the chance that sometimes the wrong claim text is being used as an example for training the classifier.

For applications that were examined during the relevant time period but that were not subject to a subject-matter rejection (that is, they "passed" the test), the process prefers to use claim 1 from the patent (if any) that issued on the corresponding application. Claim 1 from the issued patent is preferred, because it reflects the claim in final form, after it has been evaluated and passed all of the relevant statutory requirements, including subject-matter eligibility, based on the existence of an office action issued during the relevant time period. If there is no issued patent, such as because the applicant and examiner are still working through issues of novelty or non-obviousness, some embodiments of the process currently elect not to use claim 1 from the published patent application. For machine learning purposes, this results in improved performance, possibly because the claims evaluated for subject-matter compliance were actually markedly different than the published claim 1.

Note that the above-described process may be iteratively performed. From an initial random sample of patent applications, it is possible to identify those where subject-matter rejections are common. The system may identify features that are positively associated with subject-matter rejections, such as application number, filing date, patent classification, application keywords, examiner name, art unit, or the like. Then, the process preferentially obtains additional applications that have one or more of those features, in order to increase the likelihood of obtaining office actions that contain subject-matter rejections.

Figure 2:
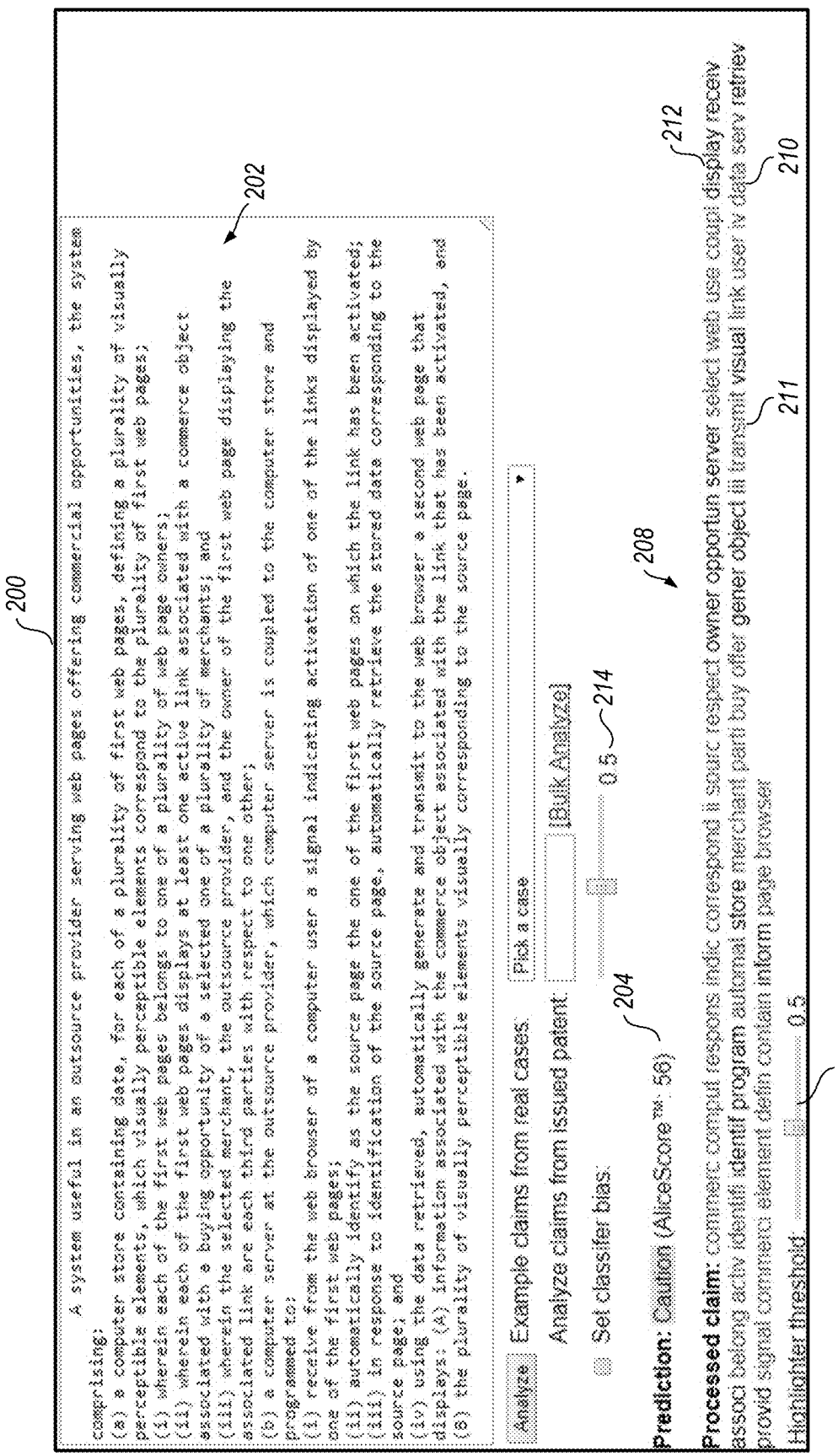
FIG. 2 is a screen shot of a text classification user interface according to one embodiment.

FIG. 2 is a screen shot of a text classification user interface according to one embodiment. FIG. 2 shows a Web browser 200 that is displaying a page that interacts with the TCS 100. The displayed page includes a form that contains patent claim text 202 input by a user. The text 202 is transmitted to the TCS 100 and evaluated. The TCS 100 in this embodiment uses multiple distinct classifiers in a voting ensemble. The text 202 is given to each of the classifiers in the ensemble, which each provide their classification determination. The TCS 100 then returns an evaluation result 204, which in this case is a score between 0 and 100, which reflects the percentage of classifiers that determined that the given claim was patent eligible.

The TCS 100 also provides claim terms 208 (stemmed in this case) with associated correlation scores. Each correlation score (e.g., in the range of −1 to 1) is a measure of how highly the corresponding term is with eligibility or ineligibility. The terms 208 are colored green and red to respectively indicate eligibility and ineligibility. In this example, term 210 ("data") is colored red to indicate a correlation with ineligibility; term 211 ("transmit") is colored green to indicate a correlation with eligibility. A user can select a threshold 206 that controls the coloring operation. A threshold of 0 means that all terms will be colored either red or green. A threshold of 0.5, as shown, will cause only those terms having a score greater than 0.5 or less than −0.5 to be colored. In this case, term 212 ("display") is colored black to indicate that it is within the threshold.

Users can benefit from the coloration of claim terms, because it can provide guidance as to how to modify a given claim in order to make the claim less abstract. Some embodiments include a thesaurus or related terms function (e.g., provided by word2vec) that can suggest alternate terms to use in place of those that are highly correlated with ineligibility. Such terms can encourage or cause the user to redraft the claim at a lower level of abstraction and/or to focus the claim on specific operations rather than generic solutions or results.

In this embodiment, the user can also select a classifier bias 214. Classifier bias is used to make the classifier more or less likely to find claims ineligible. A classifier that is biased towards finding claims eligible may be useful if the user is only interested in finding truly egregious claims. Bias can be implemented in various ways. In one approach, bias is implemented as a cutoff or threshold used in conjunction with a classifier that provides a probability, such as a Bayesian classifier. Rather than using 50% as the cutoff between eligibility and ineligibility, bias pushes that cutoff higher or lower depending on the user's selection. Another approach to implementing bias relies on training multiple classifiers with different mixes of positive and negative examples. If each successive classifier is trained with an increasing ratio of positive to negative examples, then each successive classifier is then more likely to classify claims as ineligible. Selecting a bias value then causes the selection of a particular one of the multiple classifiers.

2. Example Processes

FIGS. 3A-3J are example flow diagrams of network information distribution processes performed by example embodiments.

Figure 3A:
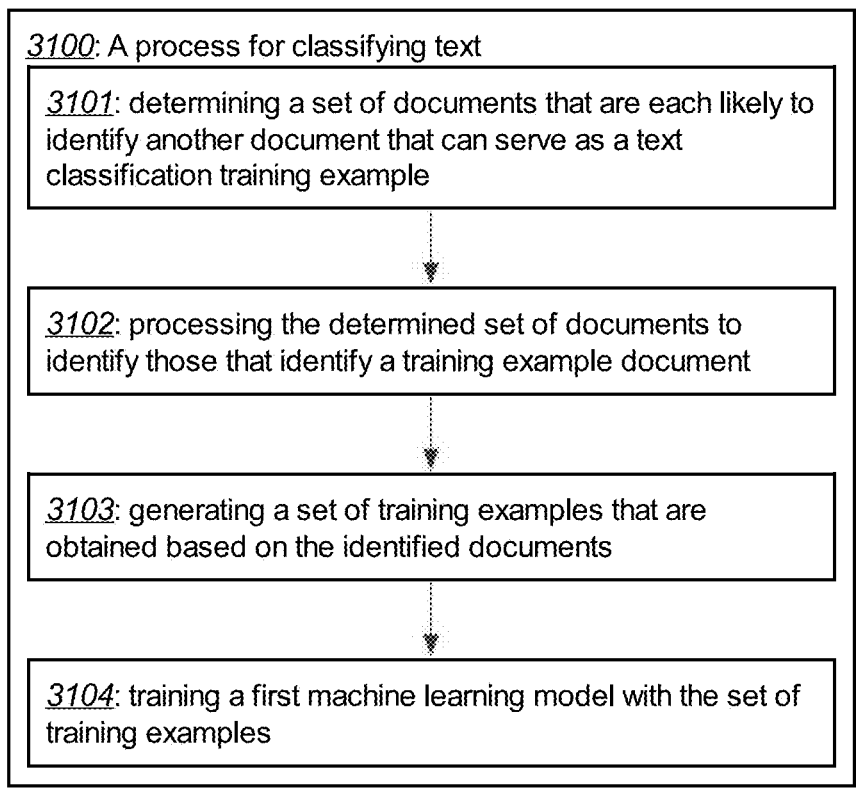

FIG. 3A is a flow diagram of example logic for classifying text. The illustrated logic in this and the following flow diagrams may be performed by, for example, the text classification system 100 described herein. This process operates in a context where training examples cannot be obtained directly. For example, the source data corpus may be very large but contain only a small number of training examples. As another example, it may be necessary to process another document to determine the proper classification of a given training example. More particularly, FIG. 3A illustrates a process 3100 that includes the following block(s).

Block 3101 includes determining a set of documents that are each likely to identify another document that can serve as a text classification training example. In this step, the process determines features that are associated with documents that may provide useful information for gathering training examples for training a text classifier. Such features may include one or more of date, keywords, title, author, associated persons/organizations, or the like. The features may be identified by creating a correlation matrix or similar feature-identification techniques. For a document to provide information for gathering training examples, the document will typically contain information (e.g., text) that identifies or can be used to identify the actual training example. Thus, the document may be a human analysis of some other document. In the patent context, the document is an office action that includes a rejection of a patent claim (the training example). The patent claim is not obtained directly from the office action, but can be obtained based on information included therein.

Block 3102 includes processing the determined set of documents to identify those that identify a training example document. As noted, the determined set of documents does not provide the training example directly. Rather, it identifies (e.g., discusses, references) the training example. The documents of the determined set may be scanned or run through a classifier to identify training examples and/or to determine the class of a particular training example. In some cases, this step may also include obtaining related documents (e.g., office actions) and processing those related documents to identify training examples.

Block 3103 includes generating a set of training examples that are obtained based on the identified documents. Once training examples have been identified, the process may obtain (e.g., download, search) actual training examples, which are typically represented as text documents or strings.

Block 3104 includes training a first machine learning model with the set of training examples. The training examples are then used to train one or more machine learning models, such as Bayesian, Logistic Regression, Decision Trees, or the like. The features used for training typically include text terms, but can also or instead include features such as length, number of clauses, syntactic or semantic features, n-grams, or the like.

FIG. 3B is a flow diagram of example logic illustrating an extension of process 3100 of FIG. 3A. This figure illustrates a process for identifying documents that are likely to identify text classification examples. More particularly, FIG. 3B illustrates a process 3200 that includes the process 3100, wherein the determining a set of documents that are each likely to identify another document that can serve as a text classification training example includes the following block(s).

Block 3201 includes downloading multiple documents. Initially, a batch of documents, possibly selected at random, is downloaded.

Block 3202 includes determining one or more features that are correlated with documents that are associated with training examples. By using the downloaded documents, the process identifies features that frequently appear in those documents that are associated with (e.g., reference, describe) other documents that can be used as training examples. Such features may be keywords, title words, dates, people or organizations associated with the documents, or the like.

Block 3203 includes generating a list of documents having the determined features. Once the relevant features have been determined, the process generates a list of documents having those features. The list may be generated by searching a document database for documents having particular keywords, classifications, or the like.

FIG. 3C is a flow diagram of example logic illustrating an extension of process 3200 of FIG. 3B. More particularly, FIG. 3C illustrates a process 3300 that includes the process 3200, and which further includes the following block(s).

Block 3301 includes training, based on the one or more features, a second machine learning model to recognize documents that reference training examples. In some embodiments, the identified features can be used to train a machine learning model to recognize those documents that reference training examples. Using this feature, documents can be bulk processed to generate a list of documents that are useful starting points in the search for training examples. This list can then be further processed, such as by scanning for text strings, or the like, in order to identify the actual training example.

FIG. 3D is a flow diagram of example logic illustrating an extension of process 3100 of FIG. 3A. This process employs the above-described training process in the context of classifying patent claims. More particularly, FIG. 3D illustrates a process 3400 that includes the process 3100, wherein the determining a set of documents that are each likely to identify another document that can serve as a text classification training example includes the following block(s).

Block 3401 includes identifying patent applications that have associated office actions that include subject-matter rejections, wherein the training examples are patent claims obtained from the publications or patents issued from the patent applications.

Figure 3E:
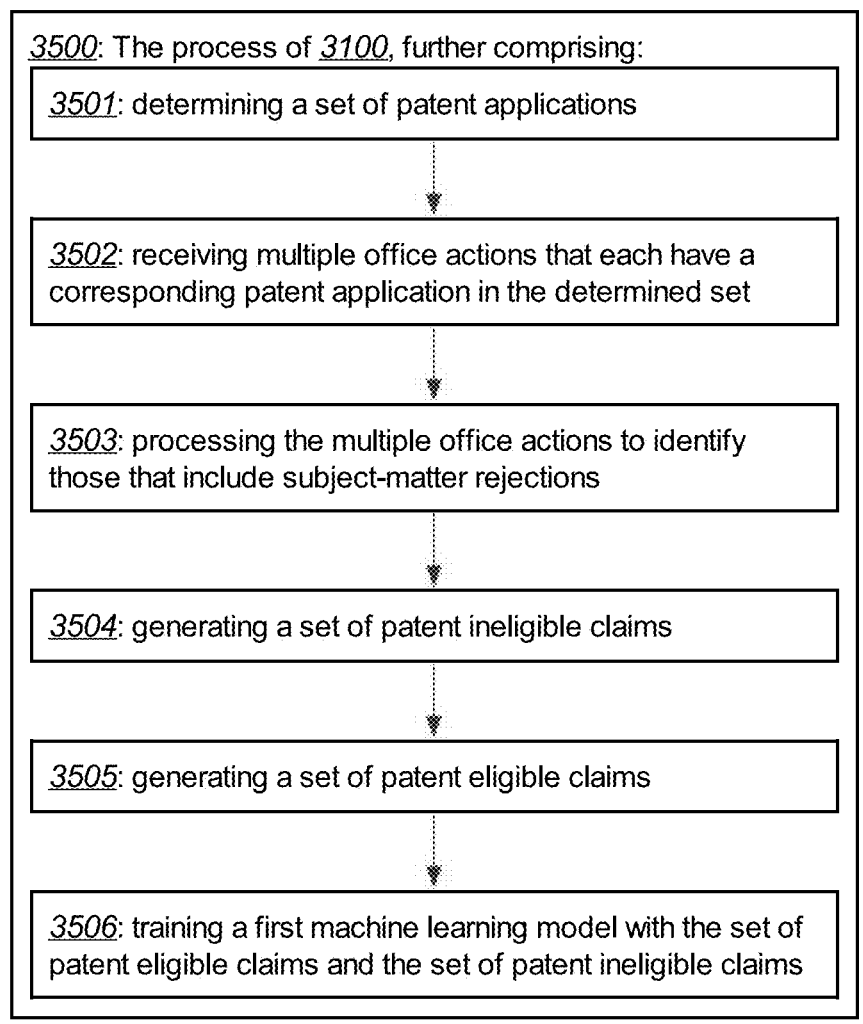

FIG. 3E is a flow diagram of example logic illustrating an extension of process 3100 of FIG. 3A. The illustrated logic in this and the following flow diagrams may be performed by, for example, the text classification system 100 described herein. More particularly, FIG. 3E illustrates a process 3500 that includes the process 3100, and which further includes the following block(s).

Block 3501 includes determining a set of patent applications that are likely to have subject-matter rejections. Determining the patent applications may include obtaining a random sample of patent applications, and then identifying those that are likely to include subject matter rejections. Promising applications may be identified by date, by subject matter area, by examining corresponding office actions, and/or other features.

Block 3502 includes receiving multiple office actions that each have a corresponding patent application in the determined set. The process may receive the office actions from a public data source, such as PAIR.

Block 3503 includes processing the multiple office actions to identify those that include subject-matter rejections. This step may include performing optical character recognition to transform scanned documents into text. Then, the text may be processed, by string search, machine classification, or other mechanism, to identify those that include the relevant rejections.

Block 3504 includes generating a set of patent ineligible claims that are obtained from patent applications that have office actions that include subject-matter rejections. The claims may be generated by reference to published applications and/or prosecution data.

Block 3505 includes generating a set of patent eligible claims that are obtained from patent applications that do not include subject-matter rejections. The claims may be generated by reference to published applications and/or issued patents.

Block 3506 includes training a first machine learning model with the set of patent eligible claims and the set of patent ineligible claims. The two sets of claims are then used to train one or more machine learning models, such as Bayesian, Logistic Regression, Decision Trees, or the like. The features used for training typically include the terms of the claims, but can also or instead include features such as claim length, number of clauses, n-grams, or the like.

FIG. 3F is a flow diagram of example logic illustrating an extension of process 3500 of FIG. 3E. This figure illustrates a process for identifying patent applications that are likely to include claims that have patent eligibility issues. There are hundreds of thousands of patent applications filed every year at the PTO, but only a fraction of those are rejected for being directed to non-patentable subject matter. In order to increase the likelihood of finding examples of ineligible claims, this process identifies applications that are likely to contain such rejections, based on various factors, such as keywords, class, date, or the like. More particularly, FIG. 3F illustrates a process 3600 that includes the process 3500, wherein the determining a set of patent applications includes the following block(s).

Block 3601 includes downloading multiple office actions, from a random sample of patent applications. Initially, a random sample of applications is downloaded. Then, office actions from those applications are obtained.

Block 3602 includes determining one or more features that are correlated with subject-matter rejections, the determining based on the downloaded office actions and the random sample of patent applications. By using the downloaded office actions, the process identifies a first set of applications that include subject-rejections and a second set of applications that do not. These applications can then be processed to identify features that are correlated (negatively or positively) with subject-matter rejections. Possible features may include filing date, subject matter classification, keywords (e.g., occurring in the title, abstract, description, claims, etc.). Some features may not be "internal" to the application, and instead relate to the posture of the application within the Patent Office, such as the assigned art unit or examiner. Also, the existence of particular petitions, such as petitions to accelerate or expedite examination, may be relevant.

Block 3603 includes generating a list of patent applications having the determined features. Once the relevant features have been determined, the process generates a list of patent applications having those features. The list may be generated by searching a patent application database for applications having particular keywords, classifications, or the like.

FIG. 3G is a flow diagram of example logic illustrating an extension of process 3500 of FIG. 3E. This figure illustrates a process that classifies patent claims using the machine learning model trained as described herein. More particularly, FIG. 3G illustrates a process 3700 that includes the process 3500, and which further includes the following block(s).

Block 3701 includes receiving text of a patent claim. The text of the patent claim is typically received via a user interface form, such as a Web form.

Block 3702 includes determining, based on the trained machine learning model, whether or not the patent claim is patent eligible. The text may be processed and then passed to the machine learning model. For example, the claim may be optionally stemmed and then reduced to a bag of words. The processed claim is then provided to the classifier for analysis.

Block 3703 includes providing output that describes whether or not the patent claim is patent eligible. The output typically includes a score (e.g., a confidence or likelihood provided by the classifier) and/or text that characterizes the classification.

FIG. 3H is a flow diagram of example logic illustrating an extension of process 3700 of FIG. 3G. This figure illustrates a process that implements a voting ensemble classification technique. Multiple distinct classifier models are trained, and then polled to determine the final classification result. More particularly, FIG. 3H illustrates a process 3800 that includes the process 3700, and which further includes the following block(s).

Block 3801 includes training multiple machine learning models. One embodiment may train Bayesian, Logistic Regression, Support Vector Machine, Random Forest, and Neural Network classifiers.

Block 3802 includes determining whether or not the patent claim is patent eligible based on results obtained from the multiple machine learning models, wherein the claim is eligible when a majority of the models indicate that the claim is eligible. The multiple classifiers then "vote" to determine the final classification.

FIG. 3I is a flow diagram of example logic illustrating an extension of process 3700 of FIG. 3G. This figure illustrates a process for creating a classifier that has a selectable "sensitivity" level. In some applications, it may be useful to "bulk" process a large number of claims, and only return those that are clearly ineligible. This can be done in some embodiments by using a classifier that returns a probability (e.g., a Bayesian classifier), and setting a higher cutoff for what is considered to be ineligible. Some types of classifiers do not however return a probability. In such cases, a selectable sensitivity classifier can be created using the following process. More particularly, FIG. 3I illustrates a process 3900 that includes the process 3700, and which further includes the following block(s).

Block 3901 includes training multiple machine learning models, wherein each model is trained using a different mix of eligible and ineligible claims such that each successive model is trained using a mix that has a higher fraction of ineligible claims than its preceding model. The process trains multiple classifiers, typically of the same type, such as Logistic Regression. Given N classifiers ($c1, c2, \ldots cN$), each successive classifier is trained with an increasing ratio of positive to negative examples. In one embodiment, each classifier i is trained using a ratio of positive to negative examples equal to i/4. In this embodiment, given N=20, classifier i=1 would be trained using a ratio of 1:4 or 0.25; classifier i=5 would be trained using a ratio of 5:4, or 1.25; classifier i=20 would be trained with a ratio of 20:4, or 5.0. A classifier trained with a higher ratio becomes biased towards finding claims ineligible, because its ground truth is a universe in which most claims are ineligible.

Block 3902 includes receiving an indication of a classifier sensitivity level. In some embodiments, the sensitivity level is a number between 1 and 100.

Block 3903 includes selecting one of the machine learning models based on the classifier sensitivity level. The sensitivity level is used to select one of the models. A higher sensitivity level results in the selection of a classifier that is biased towards finding ineligible claims.

Block 3904 includes determining whether or not the patent claim is patent eligible based on text of the patent claim evaluated by selected machine learning model. Patent claim text is then input to the selected classifier, and its result is used to determine whether the claim is eligible or not.

FIG. 3J is a flow diagram of example logic illustrating an extension of process 3700 of FIG. 3G. This figure illustrates a user interface feature that is useful for claim development. A user can be provided with information regarding which claim terms are highly associated with eligibility or ineligibility. The user can make use of this information by redrafting the claim using different, more concrete terms. More particularly, FIG. 3J illustrates a process 31000 that includes the process 3700, and which further includes the following block(s).

Block 31001 includes providing output that highlights one or more terms from the patent claim to indicate a positive or negative association between each term and patent eligibility. In one embodiment, the terms are highlighted with green or red, respectively indicating a correlation with eligibility or ineligibility. Some embodiments allow the user to specify a threshold level, such that only claim terms that have a correlation that is above the threshold level are colored.

Even though the above processes are sometimes described in the context of patent evaluation, the techniques are equally applicable in other contexts. For example, the techniques may be used to detect workplace fraud. In one embodiment, the described processes may analyze a large corpus of corporate documents (emails, expense reports, vacation requests, planning documents) to identify those documents that reference other documents (e.g., travel and expense receipts) which are actually used as training examples.

3. Example Computing System Implementation

Figure 4:
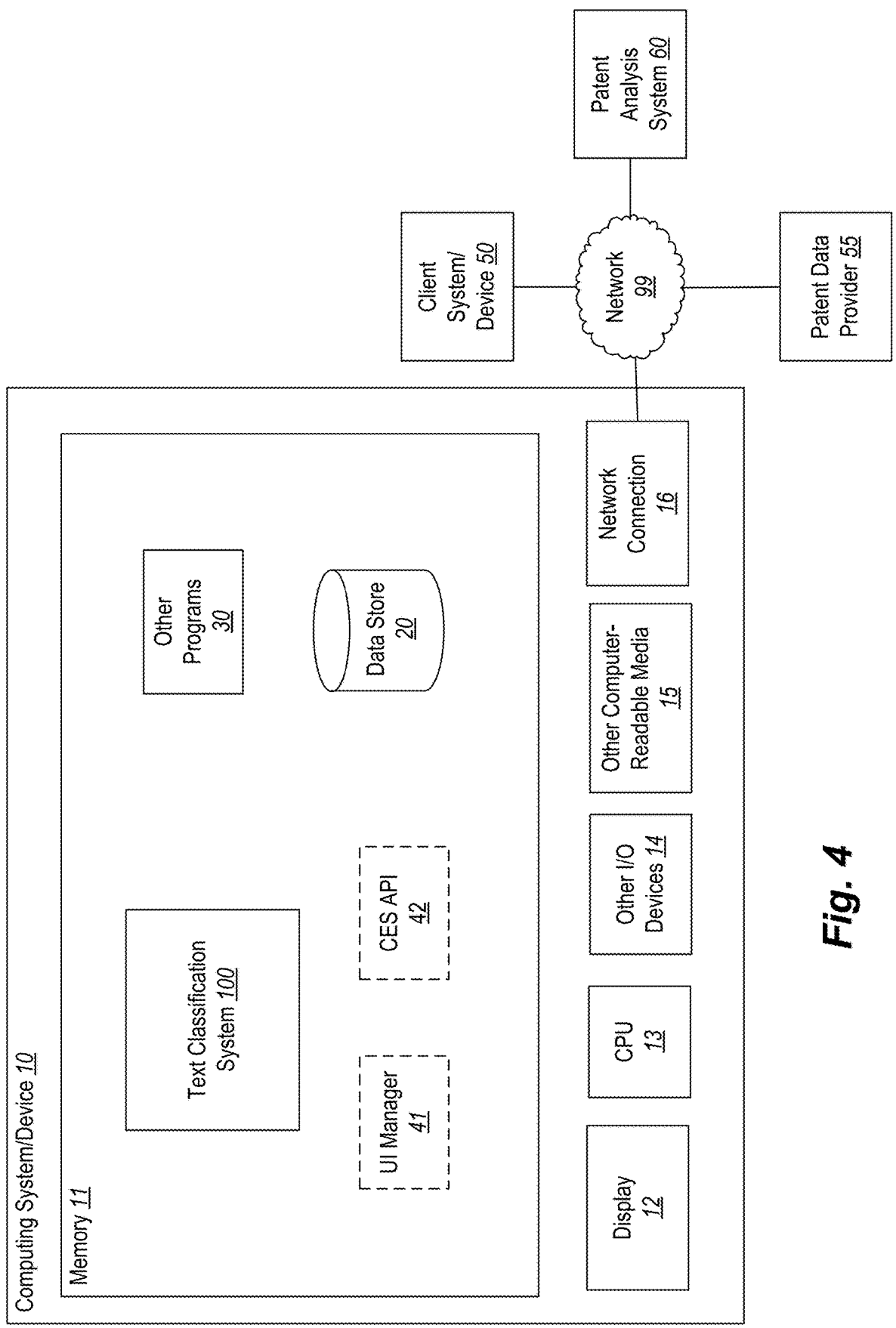
FIG. 4 is a block diagram of an example computing system for implementing a text classification system according to an example embodiment.

FIG. 4 is a block diagram of an example computing system for implementing a text classification system according to an example embodiment. In particular, FIG. 4 shows a computing system or device 10 that may be utilized to implement a TCS 100. The TCS 100 performs one or more of the process described above.

Note that one or more general purpose or special purpose computing systems/devices may be used to implement the TCS 100. However, just because it is possible to implement the manager on a general purpose computing system does not mean that the techniques themselves or the operations (taken alone or in combination) required to implement the techniques are conventional or well known.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The TCS 100 is shown residing in memory 11. In other embodiments, some portion of the contents, some or all of the components of the TCS 100 may be stored on and/or transmitted over the other computer-readable media 15. The TCS 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The TCS 100 interacts via the network 99 with a client device/system 50, a patent data provider 55, and a patent analysis system 60. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices.

The TCS 100 is shown executing in the memory 11 of the computing system 10. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the TCS 100.

The UI manager 41 provides a view and a controller that facilitate user interaction with the TCS 100 and its various components. For example, the UI manager 41 may provide interactive access to the TCS 100, such that users can interact with the TCS 100, such as by controlling the training operation and/or analyzing patent claims. In some embodiments, access to the functionality of the UI manager 41 may be provided via a Web server, possibly executing as one of the other programs 30. In such embodiments, a user operating a Web browser executing the client system/device 50 can interact with the TCS 100 via the UI manager 41.

The API 42 provides programmatic access to one or more functions of the TCS 100. For example, the API 42 may provide a programmatic interface to one or more functions of the TCS 100 that may be invoked by one of the other programs 30 or some other module. In this manner, the API 42 facilitates the development of third-party software, such as user interfaces, plug-ins, adapters (e.g., for integrating functions of the TCS 100 into Web applications), and the like.

In addition, the API 42 may be in at least some embodiments invoked or otherwise accessed via remote entities, such as code executing on the client device 50 and/or patent analysis system 60. For example, the patent analysis system 60 may be a computing system that is used to manage and analyze large patent portfolios. The patent analysis system 60 may provide batches of patents to the TCS 100 for bulk analysis via the API 42. The API 42 may also be configured to provide management widgets (e.g., code modules) that can be integrated into the patent analysis system 60 and that are configured to interact with the TCS 100 to make at least some of the described functionality available within the context of other applications (e.g., mobile apps).

In an example embodiment, components/modules of the TCS 100 are implemented using standard programming techniques. For example, the TCS 100 may be implemented as a "native" executable running on the CPU 13, along with one or more static or dynamic libraries. In other embodiments, the TCS 100 may be implemented as instructions processed by a virtual machine that executes as one of the other programs 30. In general, a range of programming languages known in the art may be employed for implementing such example embodiments.

The various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the TCS 100, such as in the data store 20, can be available by standard mechanisms such as through C, C++, C#, and Java APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques as described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the TCS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/454,581, entitled "System and Method for Evaluating Patent Claims for Subject Matter Rejections Under Alice v. CLS Bank," filed Feb. 3, 2017, are incorporated herein by reference, in their entireties.

While embodiments of the invention have been illustrated and described, as noted above, many changes can be made without departing from the spirit and scope of the invention. Accordingly, the scope of the invention is not limited by the above disclosure.

The invention claimed is:

1. A method for classifying text, the method comprising:
   determining a set of documents that are each likely to identify another document that can serve as a text classification training example, by determining a set of patent applications that are likely to have subject-matter rejections;
   processing the determined set of documents to identify those that each identify a training example document, by:
      receiving multiple office actions that each have a corresponding patent application in the determined set; and
      processing the multiple office actions to identify those that include subject-matter rejections;
   generating a set of training examples that are obtained based on the identified documents, by:
      generating a set of patent ineligible claims that are obtained from patent applications that have office actions that include subject-matter rejections; and
      generating a set of patent eligible claims that are obtained from patent applications that do not include subject-matter rejections; and
   training a first machine learning model with the set of training examples, by training the first machine learning model with the set of patent eligible claims and the set of patent ineligible claims, wherein the trained machine learning model is configured, in response to an input patent claim, to output a numerical likelihood that the patent claim is patent eligible.

2. The method of claim 1, wherein the determining a set of patent applications includes:
   downloading multiple office actions, from a random sample of patent applications;
   determining one or more features that are correlated with subject-matter rejections, the determining based on the downloaded office actions and the random sample of patent applications; and
   generating a list of patent applications having the determined features.

3. The method of claim 1, further comprising:
   training a second machine learning model to recognize office actions that include subject matter rejections; and
   using the second machine learning model to identify office actions that include subject matter rejections.

4. The method of claim 1, wherein the processing the multiple office actions to identify those that include subject-matter rejections includes: scanning text of the multiple office actions for text strings that indicate a subject matter rejection.

5. The method of claim 1, wherein the generating a set of patent ineligible claims includes: obtaining claims from patent application publications from the patent applications that do include subject-matter rejections.

6. The method of claim 1, wherein the generating a set of patent eligible claims includes: obtaining claims from patents issued from the patent applications that do not include subject-matter rejections.

7. The method of claim 1, further comprising:
   receiving text of a patent claim;
   determining, based on the trained machine learning model, the numerical likelihood that the patent claim is patent eligible; and
   providing output that presents the numerical likelihood that the patent claim is patent eligible.

8. The method of claim 7, further comprising:
   training multiple machine learning models; and
   determining whether or not the patent claim is patent eligible based on results obtained from the multiple machine learning models, wherein the claim is eligible when a majority of the models indicate that the claim is eligible, wherein the numerical likelihood is calculated as the number of models that indicate the claim is eligible divided by the total number of models.

9. The method of claim 7, further comprising:
   training multiple machine learning models, wherein each model is trained using a different mix of eligible and ineligible claims such that each successive model is trained using a mix that has a higher fraction of ineligible claims than its preceding model;
   receiving an indication of a classifier sensitivity level;
   selecting one of the machine learning models based on the classifier sensitivity level; and
   determining whether or not the patent claim is patent eligible based on text of the patent claim evaluated by the selected machine learning model.

10. The method of claim 7, further comprising: providing output that highlights one or more terms from the patent claim to indicate a positive or negative association between each term and patent eligibility.

11. The method of claim 10, further comprising: providing suggested alternative terms for those terms that are negatively associated with patent eligibility.

12. A system for classifying text, the system comprising:
a processor;
a memory;
a module comprising instructions stored on the memory and configured, when executed by the processor, to perform a method comprising:
  determining a set of documents that are each likely to identify another document that can serve as a text classification training example, by determining a set of patent applications that are likely to have subject-matter rejections;
  processing the determined set of documents to identify those that each identify a training example document, by:
    receiving multiple office actions that each have a corresponding patent application in the determined set; and
    processing the multiple office actions to identify those that include subject-matter rejections;
  generating a set of training examples that are obtained based on the identified documents, by:
    generating a set of patent ineligible claims that are obtained from patent applications that have office actions that include subject-matter rejections; and
    generating a set of patent eligible claims that are obtained from patent applications that do not include subject-matter rejections; and
  training a first machine learning model with the set of patent eligible claims and the set of patent ineligible claims, wherein the trained machine learning model is configured, in response to an input patent claim, to output a numerical likelihood that the patent claim is patent eligible; and
a user interface module configured to:
  receive text of a patent claim;
  display output that presents a numerical likelihood that the patent claim is patent eligible, wherein the numerical likelihood is computed by the trained machine learning model classifying the text; and
  display claim terms highlighted to indicate positive or negative associations with patent eligibility.

13. The system of claim 12, wherein the determining a set of patent applications includes:
downloading multiple office actions, from a random sample of patent applications;
determining one or more features that are correlated with subject-matter rejections, the determining based on the downloaded office actions and the random sample of patent applications; and
generating a list of patent applications having the determined features.

14. The system of claim 12, wherein the generating a set of patent eligible claims includes:
obtaining claims from patents issued from the patent applications that do not include subject-matter rejections, wherein claims from patent application publications from the patent applications that do not include subject-matter rejections are not used for training the first machine learning model when the patent application has not issued into a patent; and
storing the obtained claims in association with an eligibility indicator.

15. The system of claim 12, wherein the user interface module is further configured to:
display output that highlights one or more terms from the patent claim to indicate a positive or negative association between each term and patent eligibility, wherein the user interface module further includes a control configured to select a threshold that establishes a cutoff below which claim terms will not be highlighted; and
display suggested alternative terms for those terms that are negatively associated with patent eligibility.

16. A system for classifying text, the system comprising:
a processor;
a memory;
a module stored on the memory and configured, when executed by the processor, to:
  determine a set of documents that are each likely to identify another document that can serve as a text classification training example by identifying patent applications that have associated office actions that include subject-matter rejections;
  process the determined set of documents to identify those that each identify a training example document;
  generate a set of training examples that are obtained based on the identified documents, wherein the training examples are patent claims obtained from publications or patents issued from the patent applications; and
  train a first machine learning model with the set of training examples; and
a user interface module configured to:
  receive text of a patent claim;
  display output that presents a numerical likelihood that the patent claim is patent eligible, wherein the numerical likelihood is computed by the trained machine learning model classifying the text; and
  display output that highlights one or more terms from the patent claim to indicate a positive or negative association between each term and patent eligibility, wherein the user interface module further includes a control configured to select a threshold that establishes a cutoff below which claim terms will not be highlighted.

17. The system of claim 16, wherein the user interface module is further configured to:
display suggested alternative terms for those terms that are negatively associated with patent eligibility.

18. The system of claim 16, wherein each of the one or more terms from the patent claim has a numerical score that represents the positive or negative association between the term and patent eligibility, and wherein the control selects a numerical threshold that is compared to the numerical scores to determine whether to highlight the claim terms.

19. The system of claim 16,
wherein the module determines the set of documents by determining a set of patent applications that are likely to have subject-matter rejections;
wherein the module processes the determined set of documents by:
  receiving multiple office actions that each have a corresponding patent application in the determined set; and
  processing the multiple office actions to identify those that include subject-matter rejections; and wherein the module generates the set of training examples by:
    generating a set of patent ineligible claims that are obtained from patent applications that have office actions that include subject-matter rejections; and
    generating a set of patent eligible claims that are obtained from patent applications that do not include subject-matter rejections.

* * * * *